Patented June 20, 1933

1,915,244

UNITED STATES PATENT OFFICE

RUDOLPH BEAVER, OF BELMONT, MASSACHUSETTS, ASSIGNOR, BY DIRECT AND MESNE ASSIGNMENTS, TO RUDOLPH BEAVER, INC., OF BOSTON, MASSACHUSETTS, A CORPORATION OF MASSACHUSETTS

DETACHABLE BLADE SURGICAL KNIFE

Application filed November 4, 1931. Serial No. 572,996.

This invention relates to surgical knives of the type wherein the blade is detachable and replaceable with respect to the handle. I am well aware that knives of this general nature have been known heretofore and it is, therefore, the primary object of my invention to produce an improved knife of this character.

The delicate use required of a surgical knife demands that the blade shall be firmly supported in the handle against all possibility of accidental displacement; the surface of the blade and handle should be open and exposed for easy cleaning and sterilizing purposes; and the insertion and removal of the blade must be relatively simple, convenient and safe. The improved knife of my invention embodies to a marked degree these features which are essential in a surgical knife and which are valuable in any knife of the replaceable blade type and is exemplified herein in a surgical knife of simplified construction comprising a one-piece handle and a one-piece and imperforate blade.

These and other features of the invention will be best understood and appreciated from the following description of a preferred embodiment thereof, selected for purposes of illustration and shown in the accompanying drawing, in which Fig. 1 is a view in perspective of the blade and handle in disassembled relation;

Figure 1:
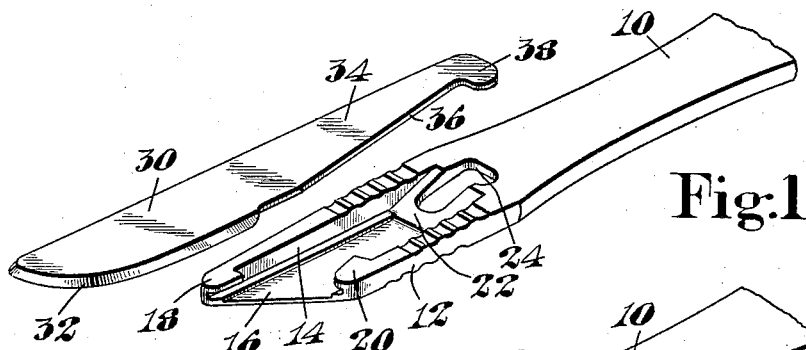

Referring more specifically to the drawing by reference characters, the knife comprises a handle 10 and a detachable blade 30. The handle 10 is of one-piece construction and preferably of metal, and may be of the same thickness throughout, as illustrated. The blade-receiving end 12 of the handle is recessed in a manner providing side walls 14 and a bottom wall 16 and leaving undercut flanges 18 and 20 at the end of the handle. The inner end of the bottom wall 16 merges into a ramp 22 inclined upwardly to the top surface of the handle, and a perforation 24 through the handle extends partially into the ramp.

Figure 3:
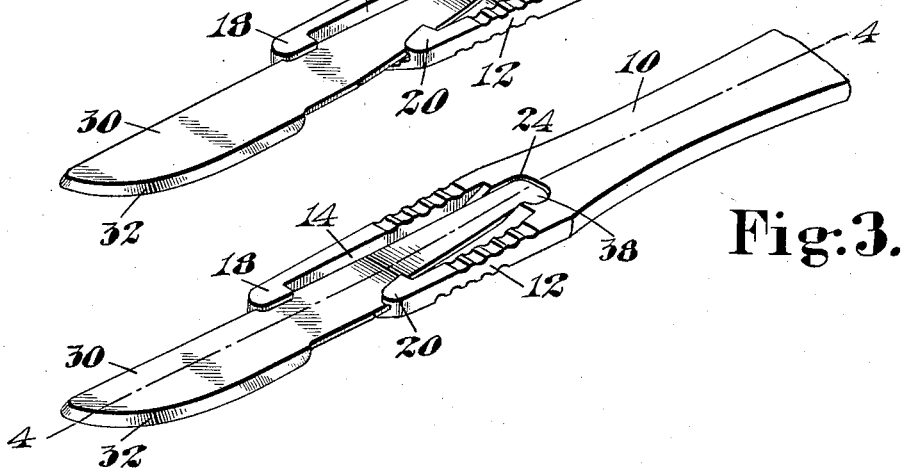
Fig. 3 is a like view showing the elements fully assembled.

The blade 30, as illustrated in the drawing, is plane and imperforate, thus eliminating cleaning and sterilizing obstacles heretofore present in more complex blades having one or more openings therethrough. The cutting portion of the blade may be of any desired shape and the blade may be sharpened at one end, as at 32. The other end 34 is cut away to provide a locking projection 38 and a tapering edge 36. The blade-receiving slots in the flanges 18 and 20 relatively converge toward the ramp 22, whereby tightly to engage the opposite edges of the blade when in the fully inserted position of Fig. 3.

Figure 2:
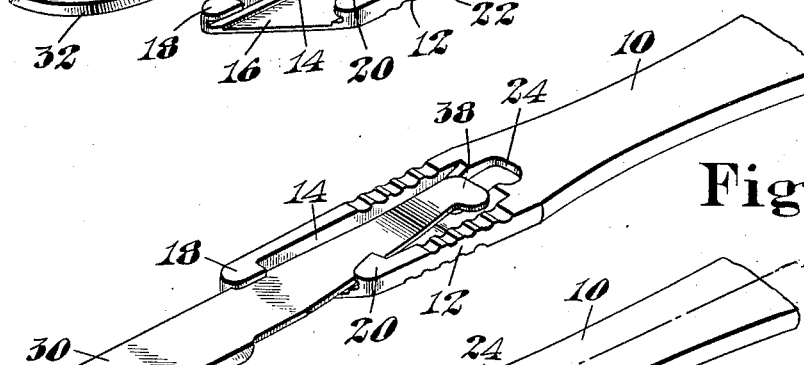
Fig. 2 is a like view showing the elements partially assembled.
Figure 4:
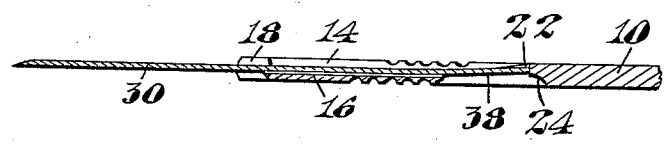
Fig. 4 is a longitudinal section of the assembled knife along line 4—4 of Fig. 3.
Figure 5:
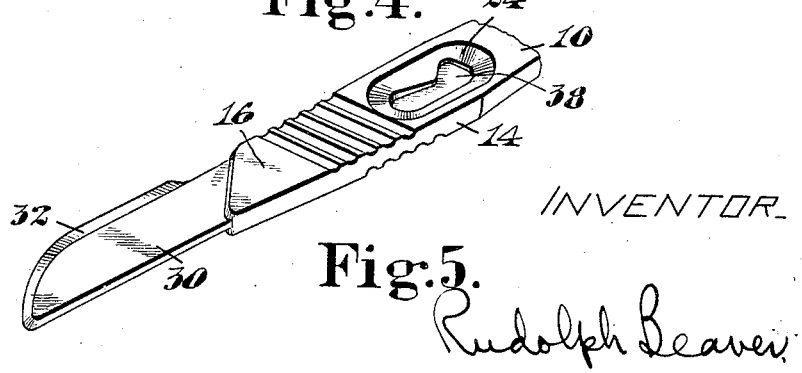
Fig. 5 is a fragmentary perspective view of the rear side of the assembled knife.

The blade is inserted in the manner shown in Fig. 2, the inserting operation being continued to the limit permitted by the converging slots in the flanges 18 and 20. During this operation, the end 38 of the blade rides up the ramp 22, and when the limit of this movement has been reached the projection 38 snaps into the perforation 24. In this position the blade is tightly engaged between the flanges 18 and 20 in a manner preventing any lateral movement or looseness thereof. Outward longitudinal movement of the blade is prevented by the engagement of its enlarged projection 38 in the offset portion of the perforation 24 in the handle. It will also be noted from Fig. 4 that the inner end of the blade is held in a slightly bowed condition and thus maintained under tension, which tends to eliminate any possibility of vibration.

It will be noted that the flanges 18 and 20 are located in offset relation rather than opposite to each other, the flange 18 engaging the back of the blade at a point in advance of the flange 20. By this arrangement the back edge of the blade is supported in an area in line with the center of pressure upon the cutting edge and a three-point system of support is provided. This oblique relation of the flanges permits them to be made relatively short and at the same time entirely effective for rigidly engaging and supporting the blade. It will be understood that in the frequent cleaning and sterilizing of the handle, the short flanges 18 and 20 are a very desirable feature.

When the blade is inserted to locked position in the handle, the end projection 38 completely fills the perforation 24 in the handle. Thus the knife as used is substantially imperforate. When the blade is to be removed for replacement or cleaning, one finger may be inserted from the rear surface of the handle in the perforation 24 and pressed against the projection 38, whereby the end of the blade is sprung upwardly to a position permitting the blade to be withdrawn from the handle. In this operation the user has only to deal with the flat faces of the blade and this may be done conveniently and without danger of cutting the fingers or of requiring the surgeon to remove his gloves.

Having thus described my invention, what I claim as new and desire to secure by Letters Patent is:—

1. A surgical knife comprising a flexible imperforate blade having a shank with a transversely extending locking projection at its end, in combination with a one-piece handle provided with a blade receiving recess which has a flat bottom surface provided at its inner end with a ramp inclined inwardly and upwardly and terminating in an aperture which extends through the handle and has an offset portion in one side; and short undercut flanges adjacent to the outer end of the recess providing slots for guiding the blade into the recess, whereby its ends may be deflected by the ramp and the locking projection caused to snap into said aperture, the ramp being so located as to maintain the inner end of the blade in deflected position when interlocked with the handle.

2. A surgical knife according to claim 1, in which slots in the undercut flanges are disposed in convergent relation and thereby act as a stop to limit the insertion of the blade as well as holding means therefor.

3. A surgical knife of the detachable-blade type having a one-piece handle provided with a recess at one end having an imperforate bottom wall and rigid flanges constituting longitudinal walls slotted to hold a blade above said bottom wall, the inner end of the recess comprising an upwardly-inclined ramp, and the handle having a locking aperture located beyond the end of the recess and extending into the upper end of the ramp and terminating short of its lower end.

In testimony whereof, I affix my signature.

RUDOLPH BEAVER.